(12) United States Patent
Panwar et al.

(10) Patent No.: US 8,873,955 B2
(45) Date of Patent: Oct. 28, 2014

(54) DISTRIBUTED SCHEDULING FOR AN OPTICAL SWITCH

(75) Inventors: Shivendra S. Panwar, Freehold, NJ (US); Yanming Shen, Brooklyn, NY (US); Shunyuan Ye, Brooklyn, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 557 days.

(21) Appl. No.: 13/281,026

(22) Filed: Oct. 25, 2011

(65) Prior Publication Data

US 2012/0128354 A1 May 24, 2012

Related U.S. Application Data (60) Provisional application No. 61/406,207, filed on Oct. 25, 2010.

(51) Int. Cl.
*H04J 14/00* (2006.01)
*H04Q 11/00* (2006.01)
*H04L 12/937* (2013.01)
*H04L 12/933* (2013.01)

(52) U.S. Cl.
CPC .......... *H04Q 11/0005* (2013.01); *H04L 49/254* (2013.01); *H04Q 2011/005* (2013.01); *H04L 49/101* (2013.01)

USPC .................. 398/56; 398/45; 398/46; 398/47; 398/48; 398/49; 398/50; 398/51; 398/52; 398/53; 398/54; 398/55; 398/57

(58) Field of Classification Search
None
See application file for complete search history.

(56) References Cited

U.S. PATENT DOCUMENTS

| | | | |
|---|---|---|---|
| 7,031,330 B1 * | 4/2006 | Bianchini, Jr. ................. | 370/412 |
| 2006/0077973 A1 * | 4/2006 | Yoon et al. ..................... | 370/363 |
| 2011/0170558 A1 * | 7/2011 | Ye et al. ......................... | 370/417 |
| 2012/0128354 A1 * | 5/2012 | Panwar et al. .................. | 398/45 |

* cited by examiner

*Primary Examiner* — Darren E Wolf
(74) *Attorney, Agent, or Firm* — John C. Pokotylo; Straub & Pokotylo (57) ABSTRACT

Scheduling methods and apparatus for use with optical switches with hybrid architectures are provided. An exemplary distributed scheduling process achieves 100% throughput for any admissible Bernoulli arrival traffic. The exemplary distributed scheduling process may be easily adapted to work for any finite round trip time, without sacrificing any throughput. Simulation results also showed that this distributed scheduling process can provide very good delay performance for different traffic patterns and for different round trip times associated with current switches.

20 Claims, 10 Drawing Sheets

CROSSPOINT IN PREVIOUS SCHEDULE (TIME SLOT, N-1)

CROSSPOINT IN HAMILTONIAN WALK SCHEDULE

TDMA-LIKE FRAME BASED SCHEDULING

CROSSPOINT IN UPDATED SCHEDULE (TIME SLOT N+1)

FIGURE 8C

DISTRIBUTED SCHEDULING FOR AN OPTICAL SWITCH

§1. RELATED APPLICATIONS

This application claims the benefit of U.S. Provisional Patent Application Ser. No. 61/406,207 (incorporated herein by reference and referred to as "the '207 provisional"), filed on Oct. 25, 2010, titled "DISTRIBUTED SWITCHING METHODS AND APPARATUS: DISQUO, HELIOS AND ALLERTON" and listing Shivendra S. PANWAR, Yanming SHEN and Shunyuan Y E and as the inventors. The present invention in not limited to requirements of the particular embodiments described in the '207 provisional application.

§2. BACKGROUND OF THE INVENTION

§2.1 Field of the Invention

The present invention concerns switches used in communications networks. More specifically, the present invention concerns scheduling the sending of packets through the switching fabric of such a switch.

§2.2 Background Information

The fast growth of traffic over the Internet and within data centers has led to an increasing demand for high-speed switching systems. Emerging websites and applications such as video streaming, live broadcasting and peer-to-peer communications, demand ever increasing bandwidth. In May 2010, Youtube announced that its daily video views had exceeded two billion. Cisco, incorporated herein by reference.) forecasts that by 2013, IP traffic may increase fivefold compared to 2011. (See, e.g., the article "Cisco visual networking index: Forecast and methodology, 2008 to 2013," http://www.cisco.com/en/US/solutions/collateral/ns341/ns525/ns537/ns705/ns827/whitep aper c11-481360.pdf (2009) Also, for fast storage-access such as such as a data center, thousands of servers may have to exchange bulk data at a very high speed. Switching vendors like Cisco, Hewlett Packard and Arista plan to ship switches that can support 40/100 Gbps by 2012. Under this fast growing traffic demand, electronic technologies may not be able to support the demands of packet switches in the near future. Power consumption may also be a major problem for electronic switches, especially in data centers. Also, almost the same amount of power may be needed to cool the devices as to operate them.

Photonic technologies can provide very high bandwidth and reduce the power consumption. Unfortunately, however, an all-optical switch is still not feasible because it is difficult to buffer packets in the optical domain. Optical fiber-based buffers can have very low power dissipation, but they are very bulky. Therefore, future switching systems may have a hybrid architecture (See, e.g., the article R. S. Tucker, "The Role of Optics and Electronics in High-Capacity Routers," *Journal of Lightwave Technology*, 24(12), (December 2006), incorporated herein by reference.), which exploits both electronic and optical technologies: packet buffering and processing may be done in the electronic domain, while packet switching from inputs to outputs may be implemented by an optical switching fabric. In such a hybrid architecture, arriving packets are converted to optical signals before being transmitted, and after traversing the optical fabric, are converted back to electrical signals in the electronic domain at egress linecards.

For input-queued (IQ) switches, there has been substantial research work on scheduling. (See, e.g., the articles, Y. Li, S. Panwar, and H. J. Chao, "On the Performance of a Dual Round-Robin Switch," *Proc. of IEEE INFOCOM* (April 2001); J. G. Dai and B. Prabhakar, "The Throughput of Data Switches with and without Speedup," *Proc. of IEEE INFOCOM* (Tel Aviv, Israel, March 2000); N. McKeown, A. Mekkittikul, V. Anantharam, and J. Walrand, "Achieving 100% Throughput in an Input-Queued Switch," *IEEE Transactions on Communications*, Vol. 47, pp. 1260-1267 (August 1999); N. Mckeown, "The iSLIP Scheduling Algorithm for Input-Queued Switches," *IEEE/ACM Transactions on Networking*, Vol. 7, pp. 188-201 (April 1999); and L. Tassiulas and A. Ephremides, "Stability Properties of Constrained Queuing Systems and Scheduling Policies for Maximum Throughput in Multihop Radio Networks," *IEEE Transactions on Automatic Control*, 37(12), pp. 1936-1949 (December 1992), all incorporated herein by reference.) Unfortunately, these algorithms for IQ switches either do not guarantee 100% throughput, or are not suitable for distributed implementation.

Fasnet is a distributed scheduling algorithm proposed for an optical switch. (See, e.g., A. Bianco, E. Carta, D. Cuda, J. M. Finochietto, and F. Neri, "A Distributed Scheduling Algorithm for an Optical Switching Fabric," *Proc. of IEEE ICC*, Beijing, China (May 2008), incorporated herein by reference.) Fasnet users used dual counter-rotating folded WDM fiber rings to connect inputs and outputs. Although, the Fasnet algorithm is distributed and simple, but it cannot achieve 100% throughput even for uniform traffic.

In view of the foregoing, it would be useful to improve scheduling in switches, such as in optical switches. It would be useful to support distributed scheduling.

§3. SUMMARY OF THE INVENTION

Exemplary embodiments consistent with the present invention improve scheduling in switches, such as an optical switch for example, by providing a distributed process in which the optical switch can achieve 100% throughput under any admissible Bernoulli traffic matrix. Such an exemplary switch is called High Energy-efficiency Locally-scheduled Input-queued Optical Switch (HELIOS). The inputs of the HELIOS may use local queue information to make their scheduling decisions. The HELIOS, which uses hybrid architecture, consumes much less power than an electronic switch.

In exemplary embodiments consistent with the present invention, minimal or no message passing between input ports and output ports is required. For example, each input port may use its local queue information and the previous time slot schedule to make its scheduling decision. Simulation results have showed that the HELIOS can provide good delay performance as compared to output-queued switches, under different types of traffic.

Embodiments consistent with the present invention provide a scheduler and scheduling method for scheduling packets in a switch having a plurality of output ports, a plurality of input ports (each having a virtual output queue corresponding to each of the plurality of output ports), and a switch fabric coupling each of the input ports with each of the output ports. Such a scheduler or scheduling method improve upon known schedulers by (a) generating or receiving a Hamiltonian walk schedule which defines, for each input port-output port crosspoint$_{i,j}$, whether the crosspoint$_{i,j}$ is in the Hamiltonian walk schedule or not; (b) accepting a previous schedule which defines, for each input port-output port crosspoint$_{i,j}$, whether the crosspoint$_{i,j}$ is in the previous schedule or not, wherein (1) for each input port i, there is at most one crosspointi,j scheduled in the previous schedule, and (2) for each output port j, there is at most one crosspoint$_{i,j}$ scheduled in the previous schedule; and (c) at each input port i, for each crosspoint$_{i,j}$ merging the previous schedule with the Hamiltonian walk schedule to define an updated schedule such that: (1) for a crosspoint$_{i,j}$ that is not in the Hamiltonian walk schedule, maintaining a value of the crosspoint$_{i,j}$ in the updated schedule as that value of the corresponding crosspoint$_{i,j}$ in the previous schedule, and (2) for a crosspoint$_{i,j}$ that is in the Hamiltonian walk schedule, (i) determining whether or not the crosspoint$_{i,j}$ belongs to the previous schedule, (ii) responsive to a determination that the crosspoint$_{i,j}$ does belong to the previous schedule, determining whether or not to maintain the crosspoint$_{i,j}$ in the updated schedule as a function of an occupancy of the j$^{th}$ virtual output queue corresponding to the input port i, and (iii) responsive to a determination that the crosspoint$_{i,j}$ does not belong to the previous schedule, (A) determining whether or not any neighbor crosspoints$_{k,l}$ of crosspoint$_{i,j}$ belong to the previous schedule by observing a monitor of the switch to determine whether the output port j received a packet from an input port k, different from input port i, in a time slot immediately before a current time slot, and responsive to a determination that the output port j did receive a packet from an input port k, different from input port i, in the time slot immediately before the current time slot, determining that the crosspoint$_{k,j}$ belonged to the previous schedule, (B) responsive to a determination that a neighbor crosspoint$_{k,l}$ of the crosspoint$_{i,j}$ belonged to the previous schedule, excluding the crosspoint$_{i,j}$ from the updated schedule, and (C) responsive to a determination that a neighbor crosspoint$_{k,l}$ of the crosspoint$_{i,j}$ did not belong to the previous schedule, determining whether or not to add the crosspoint$_{i,j}$ to the updated schedule as a function of an occupancy of the j$^{th}$ virtual output queue corresponding to the input port i.

§5. DETAILED DESCRIPTION

The present invention may involve novel methods, apparatus, message formats, and/or data structures for scheduling the serving of cells in an input-queued optical switch. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

Below, §5.1 describes an exemplary hybrid architecture optical switch in which, or with which, embodiments consistent with the present invention may be used. Exemplary apparatus which may be used to implement a scheduler consistent with the present invention are described in §5.2. Then, exemplary methods consistent with the present invention are described in §5.3. Examples illustrating operations of exemplary scheduling methods consistent with the present invention are described in §5.4. Thereafter, some characteristics of at least some of the exemplary embodiments consistent with the present invention are set forth in §5.5. Finally, some conclusions are presented in §5.6.

§5.1 EXEMPLARY ENVIRONMENT

Optical Switch

Figure 1:
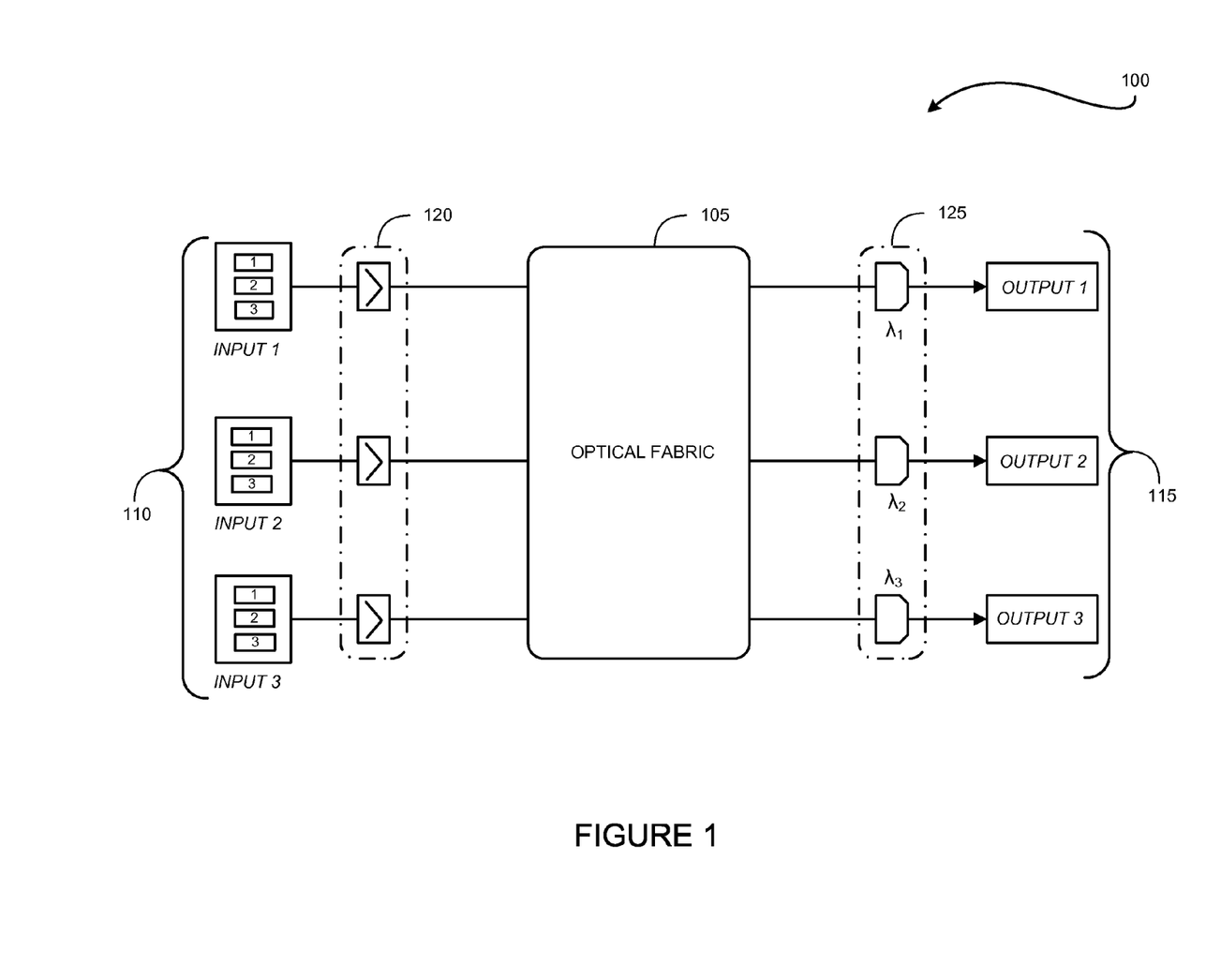
FIG. 1 is a block diagram of an exemplary optical switch in which each input port has a virtual output queue (VOQ) corresponding to each of the output ports, and in which a scheduler consistent with the present invention may be employed.

FIG. 1 is a block diagram of an N×N optical switch 100 in which each of the input ports 110 has a virtual output queue (VOQ) corresponding to each of the output ports 115. The input ports 110 use VOQs to prevent head-of-line blocking. Specifically, each input port 110 maintains N VOQs, one for each output of the N output ports 115. In at least some embodiments consistent with the invention, the optical switch 100 uses wavelength division multiplexing (WDM) in transmission of the packets from each of the input ports 110 to each of the output ports 115. Fixed size packet (cell) switching is assumed. Variable size packet switching may be implemented by introducing packet segmentation and reassembly. Note that the use of the terms "crosspoint" and "switching fabric" should not be construed to limit the switch or the scheduler to a switch having physical crosspoints or a physical crossbar structure. For example, an optical switch may be considered to have virtual crosspoints (simply referred to as "crosspoints") in an optical switching fabric.

Although an N×N switch is shown in FIG. 1, embodiments consistent with the present invention may be used in switches with different numbers of inputs and outputs. In at least some exemplary embodiments, the switch fabric 105 is an optical fabric. In at least some embodiments consistent with the present invention, the switch 100 may have a hybrid electronic-optical architecture. Such a switch consumes less power than a fully electronic switch.

The paths connecting the N inputs 110 to the switching fabric 105 and the N outputs 115 to the switching fabric 105 are all optical in nature. Each of the input ports 110 may be equipped with a fast tunable laser 120 as a transmitter. Each of the output ports 115 may have a fixed receiver 125 operating in a specific WDM channel. Each output port 115 can only receive packets transmitted using a specific wavelength, for example, $\lambda_1, \lambda_2$, and $\lambda_3$. The tunable laser at the input port 110 may transmit in any of the wavelengths assigned to the output ports 115, for example, $\lambda_1, \lambda_2$, and $\lambda_3$. More specifically, if a fixed receiver of an output port is operating at a particular wavelength, for example, $\lambda_1$, then an input port which may want to send a packet to the output port will transmit the packet at wavelength $\lambda_1$. In at least some exemplary embodiments, no two output ports may operate at a same wavelength. So, if the optical switch 100 has N outputs, it may require W wavelengths, where W≥N.

In at least some exemplary embodiments, the optical fabric 105 is a broadcast-and-select fabric, which may be a ring. (See, e.g., A. Bianco, E. Carta, D. Cuda, J. M. Finochietto, and F. Neri, "A Distributed Scheduling Algorithm for an Optical Switching Fabric," *Proc. of IEEE ICC*, Beijing, China (May 2008).) In a broadcast-and-select fabric architecture, a packet is broadcast by an input port and may therefore be made available at all the output ports. However, each output port will only receive the packet "addressed" to it—that is, a packet which is transmitted at a wavelength that the fixed receiver of the output port is configured to receive. If more than one input port send packets using the same wavelength $\lambda_i$, then this may result in a collision at output port i and the output port i may not receive any packet correctly. Bandwidth is wasted when collisions occur. A scheduling algorithm should avoid collisions from occurring. In the following embodiments, it is assumed that the system is synchronous, and time is slotted.

In the following, let $Q_{ij}$ (n) denote the queue length of $VOQ_{ij}$ (n) at time n, where n=0, 1, . . . . Let (i,j) represent the crosspoint (a virtual crosspoint defined by an {input port, output port} pair) between input i and output j. Note that each VOQ corresponds to a particular crosspoint.

Let S(n) represent a schedule at time n. In at least some exemplary embodiments for use in an N×N switch, S(n) is N×N matrix. If an input i is transmitting to output j at time n, then $S_{ij}(n)=1$. Otherwise, $S_{ij}(n)=0$. In at least some embodiments, S(n) is also a set, and (i,j)∈S(n) if $S_{ij}(n)=1$. $VOQ_{ij}$ or the connection (i, j) is "active" at time n, if $S_{ij}(n)=1$. Otherwise, the VOQ is "inactive". To avoid collisions, the schedule is defined such that at most one input may transmit to an output in any given time slot.

In the following, when referencing the performance of a switch with the exemplary scheduler, it is assumed that the arrival process at the input ports is Bernoulli. Let $\lambda_{ij}$ represent the arrival rate of traffic between input i and output j.

Definition 1: An arrival process is said to be admissible if it satisfies:

$$\Sigma_j \lambda_{ij} < 1, \text{and } \Sigma_i \lambda_{ij} < 1 \quad (1)$$

§5.2 EXEMPLARY APPARATUS

Embodiments consistent with the present invention might be implemented in hardware, such as one or more field programmable gate arrays (FPGAs), one or more integrated circuits such as an application specific integrated circuit (ASICs), and/or one or more network processors, etc. Alternatively, or in addition, embodiments consistent with the present invention might be implemented as stored program instructions executed by a processor.

Such hardware and/or software might be provided in an addressed data (e.g., packet, cell, etc.) forwarding device (e.g., a switch, a router, etc.).

Figure 2:
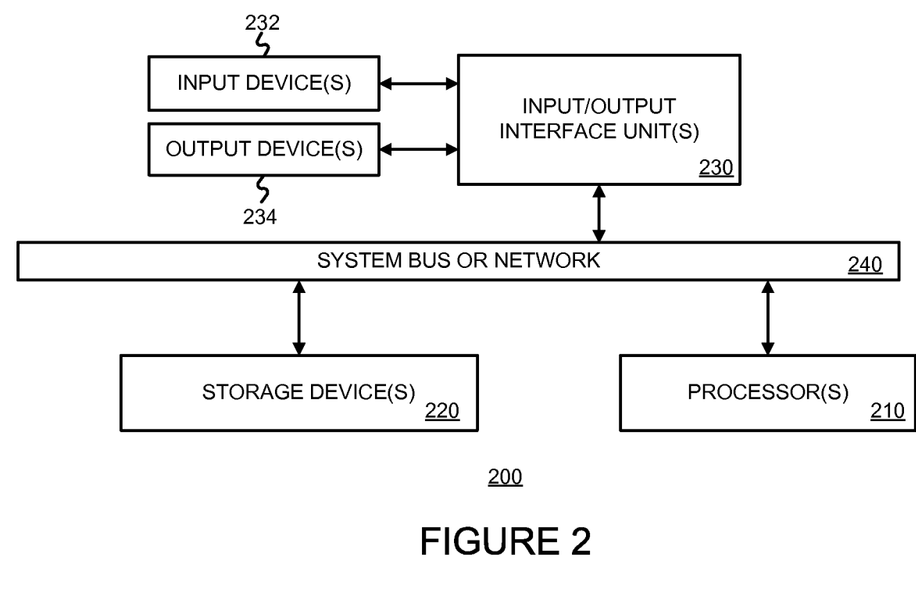
FIG. 2 is a block diagram of an exemplary apparatus that may perform various operations, and store various information generated and/or used by such operations, in a manner consistent with the present invention.

FIG. 2 is high-level block diagram of an exemplary machine 200 that may be used to perform one or more of the processes described in this application, and/or store information used and/or generated by such processes. The exemplary machine 200 includes one or more processors 210, one or more storage devices 220, one or more input/output interface units 230, and one or more system buses and/or networks 240 for facilitating the communication of information among the coupled elements. One or more input devices 232 and one or more output devices 234 may be coupled with the one or more input/output interfaces 230. The one or more processors 210 may execute machine-executable instructions (e.g., C or C++ running on the Solaris operating system available from then Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 220 and/or may be received from an external source via one or more input interface units 230.

In some embodiments consistent with the present invention, the processors 210 may be one or more microprocessors. The bus 240 may include a system bus. The storage devices 220 may include system memory, such as read only memory (ROM) and/or random access memory (RAM). The storage devices 220 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

§5.3 EXEMPLARY SCHEDULING METHODS

Figure 3:
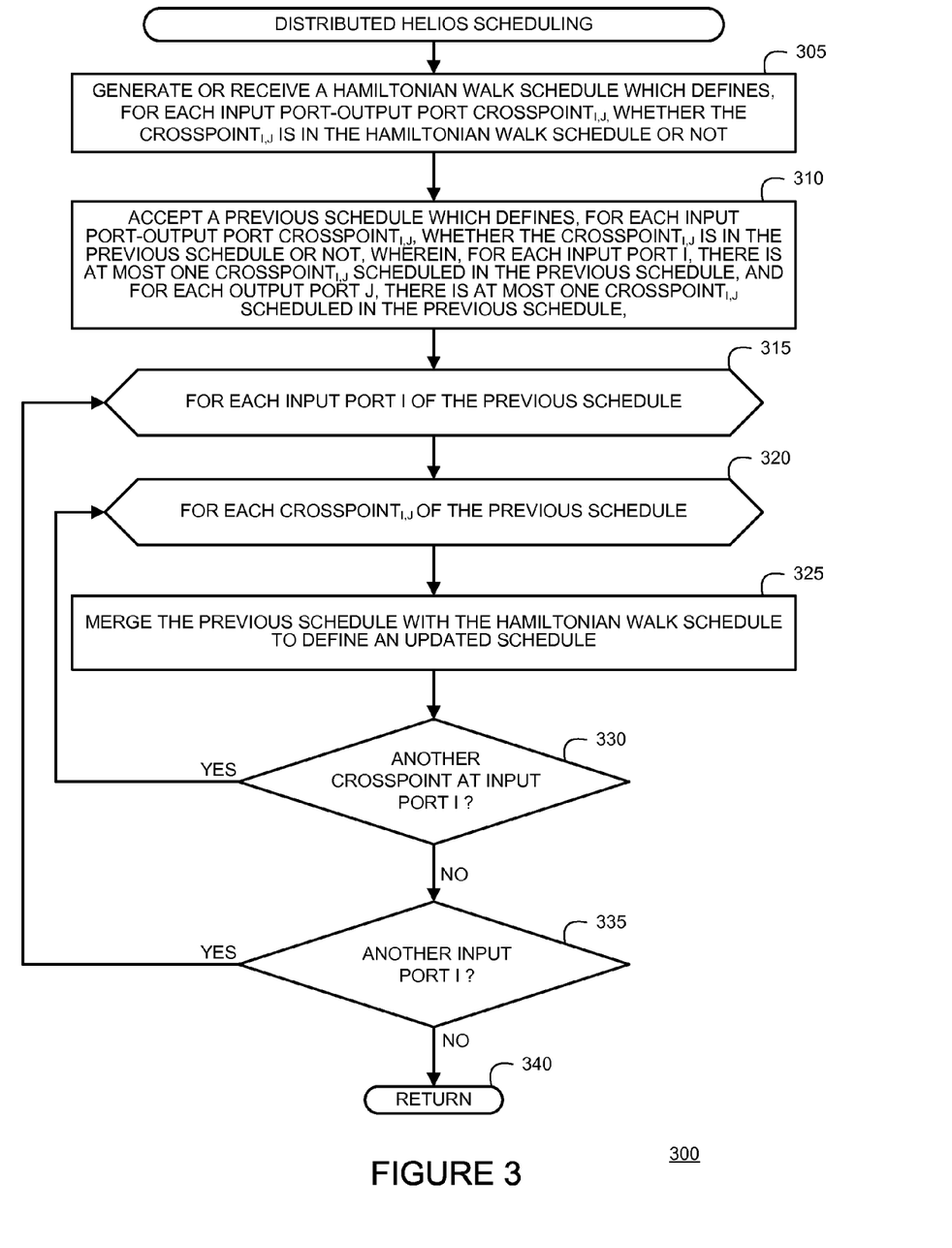
FIG. 3 is a flow diagram of an exemplary scheduling method consistent with the present invention.
Figure 4:
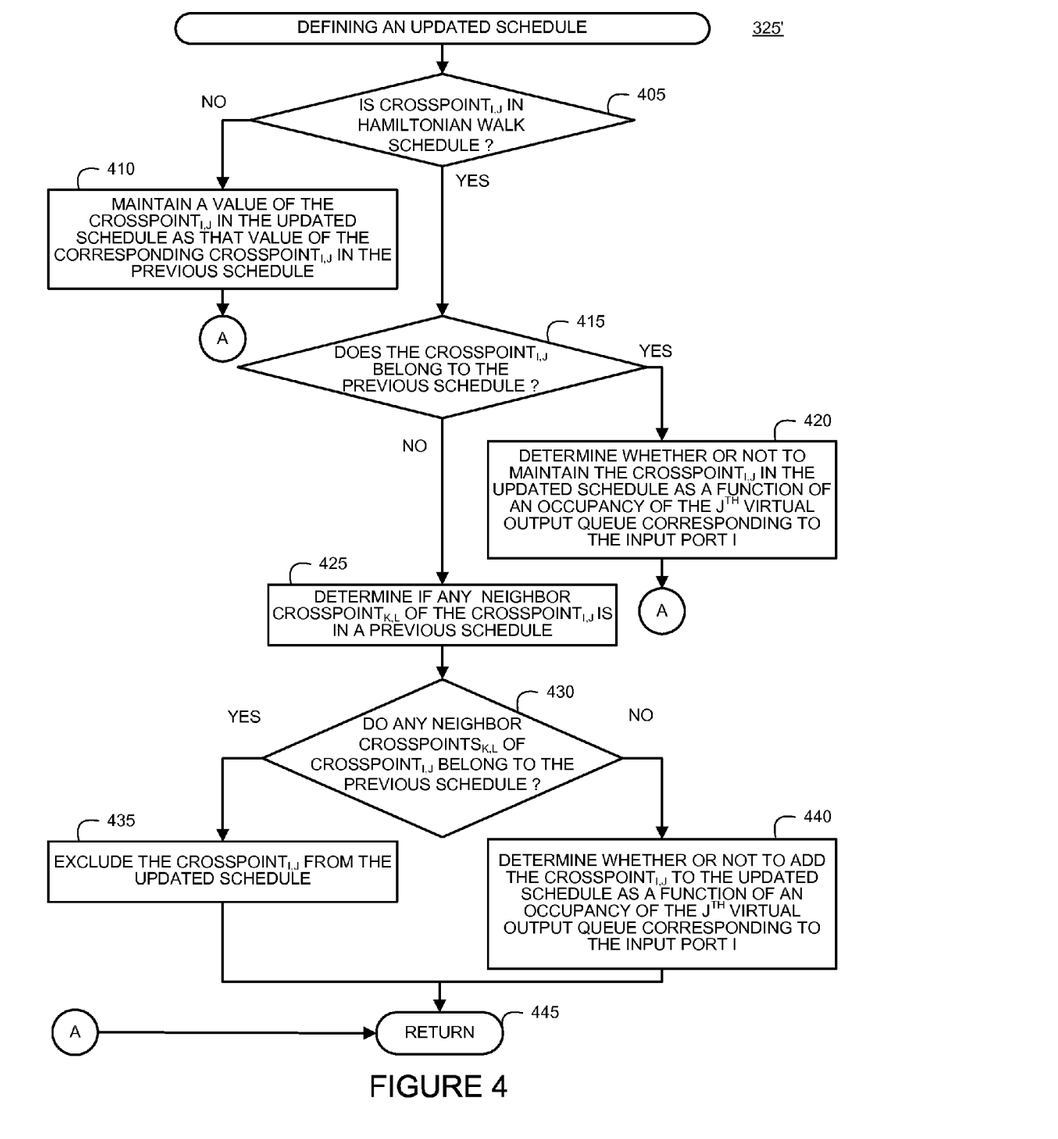
FIG. 4 is a flow diagram of an exemplary method for defining an updated schedule in an exemplary distributed scheduling method consistent with the present invention
Figure 5:
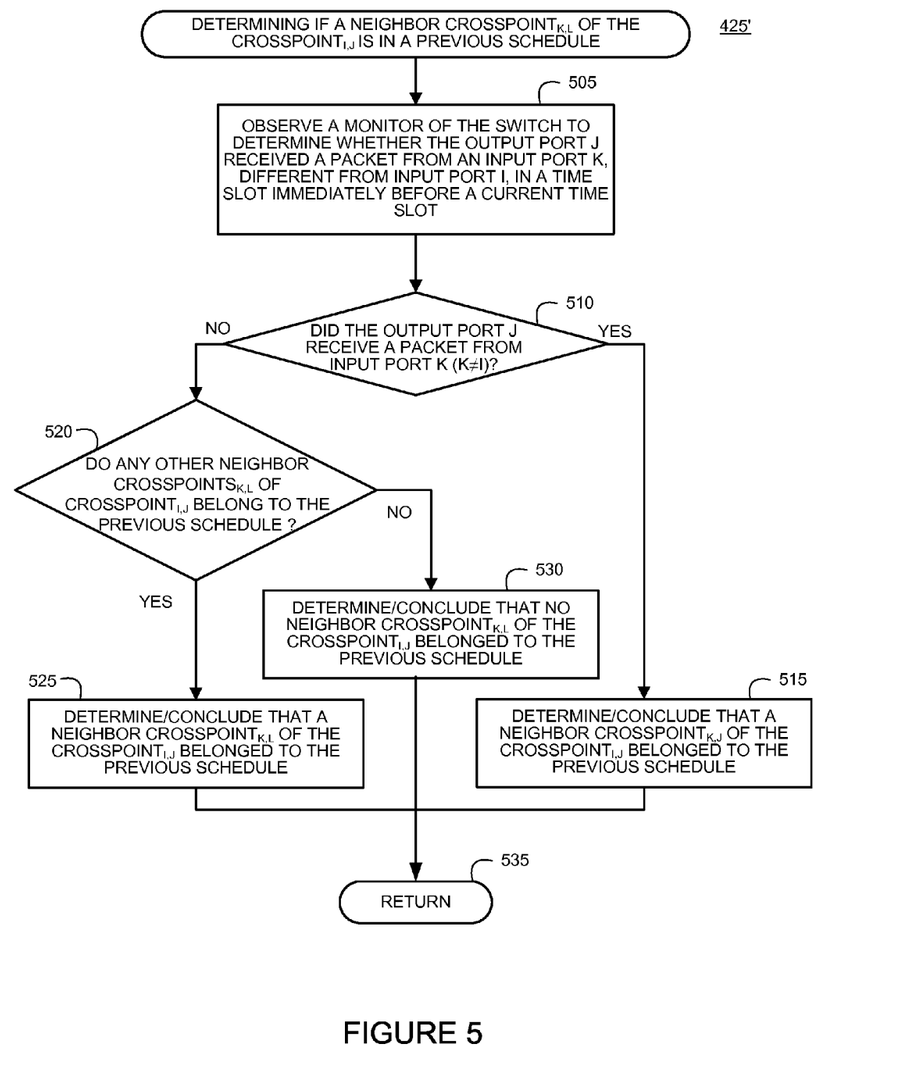
FIG. 5 is a flow diagram of an exemplary method for determining neighbor crosspoints of a crosspoint in an exemplary distributed scheduling method consistent with the present invention.

An exemplary scheduling method, consistent with the present invention, is described in this section with reference to FIGS. 3-5. Then, exemplary embodiments for frame, Time Division Multiple Access (TDMA) and TDMA-like frame based HELIOS scheduling are described in §§6.3.1-6.3.3. The exemplary scheduling method described with reference to FIGS. 3-5 assumes that a round trip time (RTT) (the time taken for a packet to traverse from a line card of the switch to the switching fabric and back to the line card) for the switch is zero, whereas the exemplary scheduling methods described in §§6.3.1-6.3.3 assume a RTT greater than zero.

FIG. 3 is a flow diagram of an exemplary scheduling method 300 consistent with the present invention. The exemplary scheduling method 300 may be used with an optical switch having (1) a plurality of output ports, (2) a plurality of input ports (each having a VOQ corresponding to each of the plurality of output ports), and (3) a switch fabric coupling each of the input ports with each of the output ports, defining crosspoints. The exemplary scheduling method 300 generates or receives a Hamiltonian walk schedule (See, e.g., the article, P. Giaccone, B. Prabhakar, and D. Shah, "Toward Simple, High Performance Schedulers for High-Aggregate Bandwidth Switches," *Proc. of IEEE INFOCOM*, (New York, 2002), incorporated herein by reference.) which defines, for each input port-output port crosspoint$_{i,j}$, whether the crosspoint$_{i,j}$ is in the Hamiltonian walk schedule or not. (Block 305) A previous schedule which defines, for each input port-output port crosspoint$_{i,j}$, whether the crosspoint$_{i,j}$ is in the previous schedule or not, is accepted. (Block 310) In the previous schedule, (1) for each input port i, there is at most one crosspoint$_{i,j}$ scheduled in the previous schedule, and (2) for each output port j, there is at most one crosspoint$_{i,j}$ scheduled in the previous schedule. Finally, for each input port i of the previous schedule (loop 315-330) and for each crosspoint$_{i,j}$ of the previous schedule (loop 320-335), the previous schedule is merged with the Hamiltonian walk schedule to define an updated schedule. (Block 325). In at least some embodiments of the invention, the updated schedule is for a current time slot, n, and the previous schedule is for a time slot immediately preceding the current time slot, for example, n−1.

Referring back to block 325, FIG. 4 is a flow diagram of an exemplary method 325' for defining an updated schedule, consistent with the present invention. It is determined whether or not the crosspoint$_{i,j}$ is in the Hamiltonian walk schedule. (Decision 405) Responsive to a determination that the crosspoint$_{i,j}$ is not in the Hamiltonian walk schedule, a value of the crosspoint$_{i,j}$ in the updated schedule is maintained as that value of the corresponding crosspoint$_{i,j}$ in the previous schedule. (Block 410) and the method 325' is left (Node 445) On the other hand, responsive to a determination that the crosspoint$_{i,j}$ is in the Hamiltonian walk schedule, it is determined whether or not the crosspoint$_{i,j}$ belongs to the previous schedule. (Decision 415) Responsive to a determination that the crosspoint$_{i,j}$ does belong to the previous schedule, it is determined whether or not to maintain the crosspoint$_{i,j}$ in the updated schedule based on an occupancy of the $j^{th}$ virtual output queue corresponding to the input port i. (Block 420) before the method 325' is left (Node 445). On the other hand, responsive to a determination that the crosspoint$_{i,j}$ does not belong to the previous schedule, it is determined if any neighbor crosspoints$_{k,l}$ of crosspoint$_{i,j}$ belong to the previous schedule. (Block 425) Then, it is determined whether or not any neighbor crosspoints$_{k,l}$ of crosspoint$_{i,j}$ belong to the previous schedule. (Block 430) (FIG. 5 illustrates an exemplary method for determining if a neighbor crosspoint$_{k,l}$ of a crosspoint$_{i,j}$ is in a previous schedule.) Responsive to a determination that a neighbor crosspoint$_{k,l}$ of the crosspoint$_{i,j}$ belongs to the previous schedule, the crosspoint$_{i,j}$ is excluded from the updated schedule. (Block 435) and the method 325' is left (Node 445). On the other hand, responsive to a determination that a neighbor crosspoint$_{k,l}$ of the crosspoint$_{i,j}$ does not belong to the previous schedule, it is determined whether or not to add the crosspoint$_{i,j}$ to the updated schedule based on an occupancy of the $j^{th}$ virtual output queue corresponding to the input port i (Block 440) and the method 325' is left (Node 445).

Referring back to block 430, a crosspoint is a "neighbor" of crosspoint$_{i,j}$ (A) if the crosspoint has the same input port i but a different output port j̄ than the output port j, or (B) if the crosspoint the same output port j but a different input port ī than the input port i.

Referring back to blocks 420 and 440, the act of determining whether or not to add the crosspoint$_{i,j}$ in the updated schedule based on the occupancy of the $j^{th}$ virtual output queue corresponding to the input port i might be performed, for example, by (1) determining a weight of the $j^{th}$ virtual output queue corresponding to the input i as a function of the occupancy of the queue, (2) determining a probability $$p_{i,j} = \frac{e^{weight_{i,j}}}{1 + e^{weight_{i,j}}},$$

and (3) adding the crosspoint$_{i,j}$ to the updated schedule with a probability $p_{i,j}$, and otherwise does not add crosspoint$_{i,j}$ to the updated schedule.

In other exemplary embodiments consistent with the present invention, the act of determining whether or not to add the crosspoint$_{i,j}$ to the updated schedule based on the occupancy of the $j^{th}$ virtual output queue corresponding to the input port i might be performed by (1) determining a probability $p_{i,j}$ as a concave function of the occupancy of the $j^{th}$ virtual output queue corresponding to the input i, and (2) adding the crosspoint$_{i,j}$ to the updated priority schedule with a probability $p_{i,j}$, and otherwise does not add the crosspoint$_{i,j}$ to the updated priority schedule.

Referring back to block 425, FIG. 5 is a flow diagram of an exemplary method 425' for determining if a neighbor crosspoint$_{k,l}$ of a crosspoint$_{i,j}$ is in a previous schedule consistent with the present invention. A monitor of the optical switch is observed to determine whether the output port j received a packet from an input port k, different from input port i, in a time slot immediately before a current time slot. (Block 505 and Decision 510) Responsive to a determination that the output port j did receive a packet from an input port k, different from input port i, in the time slot immediately before the current time slot, it is determined that the crosspoint$_{k,j}$ belonged to the previous schedule (Block 515) and the method 425' is left (Node 535). On the other hand, responsive to a determination that the output port j did not receive a packet from an input port k, it is determined whether any other neighbor crosspoint$_{k,l}$ of the crosspoint$_{i,j}$ belonged to the previous schedule. (Decision 520) Responsive to a determination that a neighbor crosspoint$_{k,l}$ of the crosspoint$_{i,j}$ belonged to the previous schedule, it is concluded that a neighbor crosspoint$_{k,l}$ of the crosspoint$_{i,j}$ belonged to the previous schedule (Block 525) and the method 425' is left (Node 535). On the other hand, responsive to a determination that no other neighbor crosspoints$_{k,l}$ of the crosspoint$_{i,j}$ belonged to the previous schedule, it is concluded that no other neighbor crosspoints$_{k,l}$ of the crosspoint$_{i,j}$ belonged to the previous schedule (Block 530) and the method 425' is left (Node 535).

Referring back to block 505, in at least some embodiments of the invention, the monitor of the switch is an energy detector (also referred to as λ-monitor). The λ-monitor detects what wavelengths are being used, from the received signal. Therefore, with a λ-monitor, by the end of each timeslot, each input port knows which of the output ports are receiving the packets transmitted by the input ports. With the help of the λ-monitor, an input port may know if a particular output port j is receiving packets from any of the other input ports. Further, since each input port i remembers its schedule of the previous time slot (that is, for which output port j was the input port i scheduled to transmit a packet), the input port i knows the output ports that are scheduled to receive packets from it. Hence, the input port i, may not have to observe the λ-monitor to obtain this information.

Referring back to FIG. 3, the scheduling method 300 is typically run multiple times (e.g., once per cell time slot). Thus, the scheduling method may further include generating or receiving a second Hamiltonian walk schedule which defines, for each input port-output port crosspoint$_{i,j}$, whether the crosspoint$_{i,j}$ is in the second Hamiltonian walk schedule or not; and merging the updated schedule with the second Hamiltonian walk schedule to define a further updated schedule and so on.

An exemplary scheduling process consistent with the present invention is now described using mathematical and set notation. First, notation used in describing a process consistent with the present invention is described.

Definition 2: A HELIOS schedule S(n) is an N×N matrix, where $S_{i,j}(n) \in \{0, 1\}$, and $\Sigma_i S_{ij}(n) \leq 1$, $\Sigma_j S_{ij}(n) \leq 1$.

If a schedule at time slot n is feasible, then no collisions will occur at that time slot. In at least some exemplary embodiments, S is also used to represent a set, and $(i,j) \in S$ if $S_{ij}=1$. For a feasible HELIOS schedule S, if $S_{ij}=1$, then $\forall i' \neq i$, $S_{i'j}=0$ and $\forall j' \neq j$, $S_{ij'}=0$. These crosspoints are defined as its neighbors.

Definition 3: For a crosspoint (i,j), its neighbors are defined as:

$$N(i,j)=\{(i',j) \text{ or } (i,j') | \forall i' \neq i, \forall j' \neq j\} \quad (2)$$

Let $\|Q\|$ represent the norm of matrix Q. Then $\|Q\|=\sqrt{\Sigma_{i,j} Q_{ij}^2}$. The stability of a system is defined as (See, e.g., the article, L. Tassiulas and A. Ephremides, "Stability Properties of Constrained Queuing Systems and Scheduling Policies for Maximum Throughput in Multihop Radio Networks," *IEEE Transactions on Automatic Control*, 37(12):1936-1949 (December 1992), incorporated herein by reference.):

Definition 4: A system of queues is said to be stable if:

$$\lim_{n \to \infty} \sup E\|Q(n)\| < \infty \quad (3)$$

HELIOS scheduling is a distributed method with a O(1) complexity which can achieve 100% throughput. Since there is at most one arrival in a time slot for each input, a schedule with a heavy weight will continue to be heavy over a few time slots. So the schedule of the previous time slot provides some information that may be utilized to generate a schedule for the next time slot. HELIOS adds (or removes) edges to (or from) the schedule of the previous slot with a probability which is a function of the queue size (as explained above). After the system converges, the schedule generated at every time slot is very close to the one with maximum weight, and therefore it can stabilize the system. The following pseudo code further describes the distributed method of generating a HELIOS schedule.

Referring back to 305 of FIG. 3, a Hamiltonian walk schedule H(n) visits each of the N! distinct matchings exactly once during N! slots. A distributed Hamiltonian walk can be simply generated with a time complexity of O(1). Note that H(n) is also a HELIOS schedule. At the beginning of a time slot n, an input/output port permutation H(n) is generated using a Hamiltonian walk. (See, e.g., the article, P. Giaccone, B. Prabhakar, and D. Shah, "Toward Simple, High Performance Schedulers for High-Aggregate Bandwidth Switches," *Proc. of IEEE INFOCOM*, (New York, 2002), incorporated herein by reference.).

Referring back to 310 of FIG. 3, a previous HELIOS schedule S(n−1), for a time slot (n−1) is accepted. Following the HELIOS scheduling process, each input port i keeps track of the schedule of the previous time slot, i.e., for which output port j was $S_{ij}(n-1)=1$.

After H(n) is generated and the previous schedule S(n−1) is accepted, each input can make its scheduling decision following the pseudo code below. Referring back to block 325 of FIG. 3, the HELIOS schedule S(n) may then be generated by merging S(n−1) and H(n) as follows:

HELIOS Scheduling Process Pseudo Code $\forall (i,j) \notin H(n)$:
  (a) $S_{ij}(n) = S_{ij}(n-1)$.
For $(i,j) \in H(n)$:
  —If $(i,j) \in S(n-1)$:
    (b) $S_{ij}(n)=1$ with probability $\underline{p}_{ij}$;
    (c) $S_{ij}(n)=0$ with probability $\underline{\bar{p}}_{ij}=1-\underline{p}_{ij}$.
  Else, if $(i,j) \notin S(n-1)$, and $\forall (k,l) \in N(i,j)$, (determine if any neighbor of the crosspoint$_{i,j}$ was active)
    If there is no l such that $S_{il}(n-1)=1$ (input port i was not transmitting at time n−1) and
    If output port j was not receiving a packet at time n−1 (input i knows this from the λ-monitor), then (there is no active neighbor (k, l) such that $S_{kl}(n-1)=1$):
      (d) $S_{ij}(n)=1$ with probability $p_{ij}$;
      (e) $S_{ij}(n)=0$ with probability $\bar{p}_{ij}=1-p_{ij}$.
    Else (there is an active neighbor)
      (f) $S_{ij}(n)=0$ (exclude the crosspoint$_{i,j}$ from consideration for the updated schedule for time slot n)

In at least some embodiments consistent with the present invention, the probability $p_{ij}$ is a concave function (as explained above) of the queue size $Q_{ij}$ such that when $Q_{ij}=0$, $p_{ij}=0$. Note that in the foregoing, $S_{ij}(n)$ can change only when crosspoint$_{ij}$ is selected by H(n).

So, in the exemplary distributed scheduling process set forth in the foregoing pseudo code, the input ports make scheduling decisions and update the HELIOS schedule based on H(n). The input ports may have to learn the state of the output ports without explicit messaging. However, by observing the λ-monitor, an input port may learn whether an output port received a packet, without the need for explicit messaging. As stated in the foregoing pseudo code, if a free input decides to set $S_{ij}(n)=1$ with probability $p_{ij}$ (step d in the pseudo code above), it will verify that output j was also free so that there does not exist any $(k, l) \in N(i, j)$ such that $S_{kl}(n-1)=1$. The input port can learn whether output port j was "free" or not by observing the λ-monitor. If an output port j was not served by any input port k, different from input port i, input port i learns that the output was "free" at time slot n−1 and confirms that $\forall (k, l) \in N(i, j)$, $S_{kl}(n-1)=0$. Also, in the foregoing exemplary distributed scheduling process the round trip time was assumed to be zero.

§5.3.1 Frame-Based Implementation

In this section, the distributed HELIOS scheduling process is adapted to work when the RTT is greater than zero. As explained earlier, with HELIOS, the input ports may have to know some information of the previous schedule, which is obtained by the λ-monitor. But when the RTT is greater than zero, for example, 2D time slots (where D is the time taken for the packets to traverse from the line card to the switching fabric), an input port can only get the information of the schedule 2D slots earlier. Therefore, HELIOS may not be used directly when D>0.

The following exemplary embodiment describes a frame-based scheduling process which modifies the HELIOS scheduling process. A frame-based scheduling process (See, e.g., A. Bianco, M. Franceschinis, S. Ghisoolfi, A. M. Hill, E. Leonardi, F. Neri, and R. Webbo, "Frame-based Matching Algorithms for Input Queued Switches", *Proc. of IEEE HPSR*, Hyogo, Japan (May 2002), incorporated herein by reference.), may not generate a new schedule at every time slot. Instead, it may generate a schedule at the beginning of a frame, and use the schedule throughout the whole frame. Suppose that the RTT is 2D time slots, then the frame size may be M slots (where M>2D, i.e., M=2D+1). So the schedules now are:

$$S(nM+k)=S(nM); \text{where } k=1,2,\ldots,M-1 \text{ and } n \text{ is a time slot} \quad (4)$$

Following the HELIOS scheduling process presented above, S(nM) only depends on S((n−1)M).

The frame-based scheduling process can stabilize the system for any admissible traffic. The system may only have to update the schedule every M slots. Frame-based scheduling may be a better choice, especially in scenarios where, for example, the tuning time of the transmitting laser is equal to one or a few slots, which may result in a high overhead if the schedule has to be reconfigured every time slot without frame-based scheduling. However, the frame-based algorithm may cause delays. First, since the frame-based scheduling updates the schedule less often, it may take a longer time for the system to converge. Also, if a VOQ is active, but the number of packets in that VOQ is less than the frame size, some bandwidth may be wasted during that frame. A TDMA-like scheduling process, described below, may improve the delay performance.

§5.3.2 TDMA-Like Scheduling Process

Figure 6:
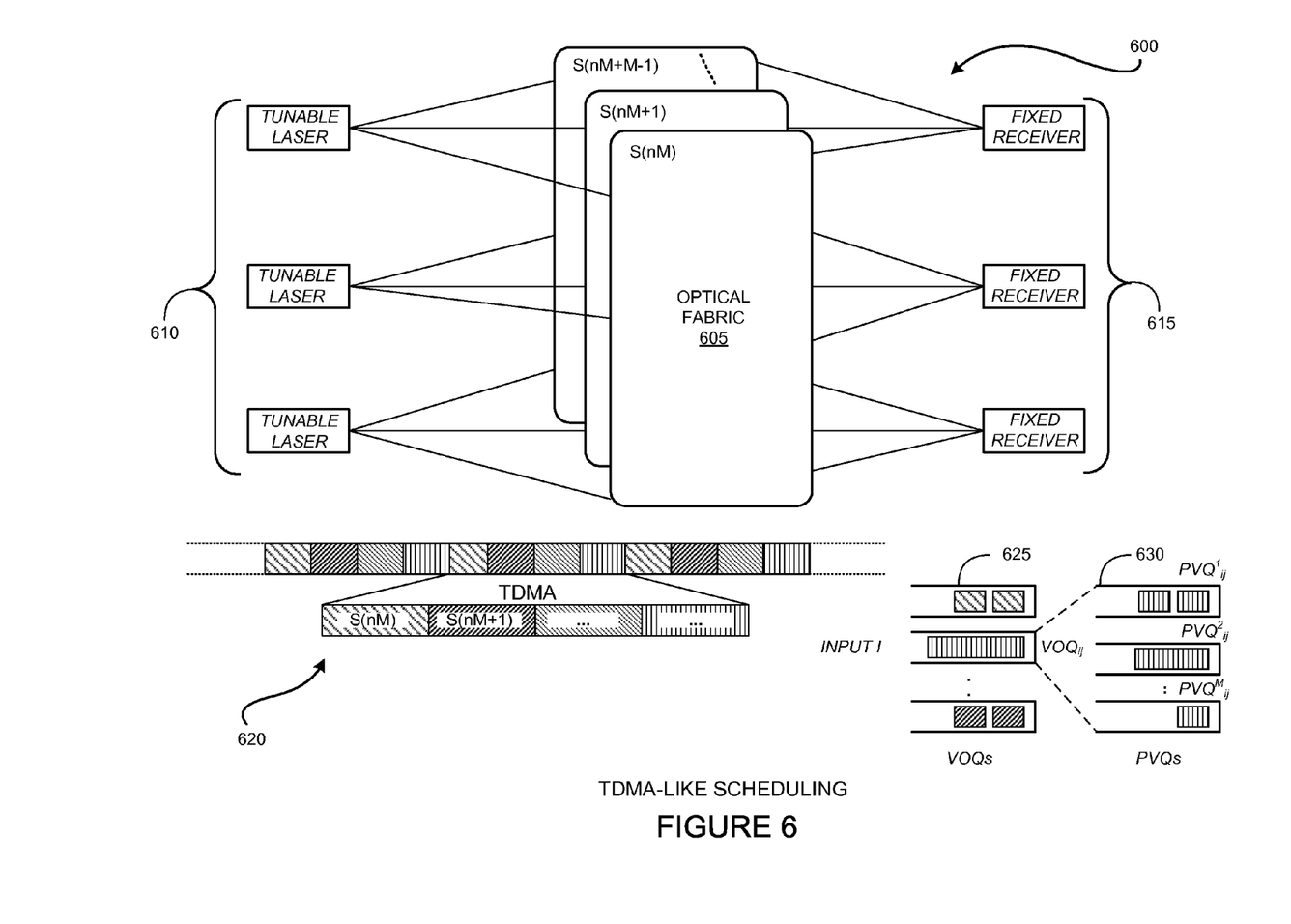
FIG. 6 illustrates an exemplary time division multiple access like distributed scheduling method consistent with the present invention.

FIG. 6 illustrates an exemplary TDMA-like distributed scheduling method in an optical switch 600 consistent with the present invention. The optical switch 600 includes input ports 610 and output ports 615 connected via an optical fabric 605. When the RTT time is greater than zero, an input port may get the information of the channel at time n by time n+M (where RTT is 2D time slots, M slots is a frame size, M>2D, i.e., M=2D+1). So it can generate the schedule S(n+M) based on S(n). Instead of using the same schedule for a frame, the system may maintain multiple schedules independently and update one every time slot. For example, the system can keep track of schedules of the previous M time slots: S(nM−M), S(nM−M+1), S(nM−M+2), . . . , S(nM+1), and generate S(nM) based on S(nM−M), generate S(nM+1) based on S(nM−M+1), and so on. These schedules are updated, independently, according to the HELIOS scheduling process described above in §6.1. So, S(nM+i), S((n+1)M+i), S((n+2)M+i), . . . is a Markov chain, where, i=0, 1, 2 . . . , M−1. The scheduling process 620 is illustrated in FIG. 6. For all these M schedules 620 maintained by the system, each one is updated and used once every M slots. This scheduling process can be thought of as a multiple-plane switch. These M planes (illustrated in optical fabric 605) are used in TDMA-like fashion. For example, at time nM, nM+M, . . . , the first plane of optical fabric 605 is used; at time nM+1, nM+M+1, . . . , the second plane optical fabric 605 is used. Each plane of the optical fabric 605 is used once every frame. For each plane, by the end of a frame, the output ports may receive the packets transmitted by the input ports. So, it may be as if RTT=0 for each plane. Then for a plane, it is similar to the HELIOS scheduling method described in §6.1 above. The difference may be that these M planes are sharing the input queues. Following HELIOS, inputs use local queue sizes to make the scheduling decisions, as explained above with reference to FIGS. 1 and 3. Therefore, the state transitions of all these M planes may be dependent on each other.

To make each of these planes exactly the same as the switch presented in reference to FIGS. 1 and 3, for each VOQ 625 of an input i, M plane virtual queues (PVQs) 630, one for each plane, are defined. Let $PVQ_{ij}^k$ represent the PVQ at input i for output j transmitted over $k^{th}$ plane, and let $Q_{ij}^k$ denote a size of the queue $PVQ_{ij}^k$. Arriving packets at a VOQ are evenly split into these PVQs. For example, a packet arrives at time n for $VOQ_{ij}$ should go to $PVQ_{ij}^k$, where k is given by: k=n mod M. An input port may have to maintain a counter for each PVQ. For example, when a packet arrives at input port i for output j, and it should be put into $PVQ_{ij}^k$, the input port i may only have to increase $Q_{ij}^k$ by one and buffer the packet in $VOQ_{ij}$. When the input port wants to transmit a packet from $PVQ_{ij}^k$, it transmits the packet from $VOQ_{ij}$ and decreases $Q_{ij}^k$ by one. Since packets are queued in each VOQ in a First-In-First-Out (FIFO) fashion, packets will also be transmitted in their arriving order.

The TDMA-like scheduling process will generally have a better delay performance than the frame-based algorithm since it updates the schedule at every time slot using fresh queue information. The TDMA-like scheduling process is a better choice, especially in scenarios where, for example, the tuning time of the transmitting laser is much less than a slot time. The TDMA-like scheduling process may have to maintain N×M counters for every input port. When the RTT is large, each input port may have to maintain a large number of counters.

§5.3.3 TDMA-Like Frame-Based Scheduling Process

Figure 7:
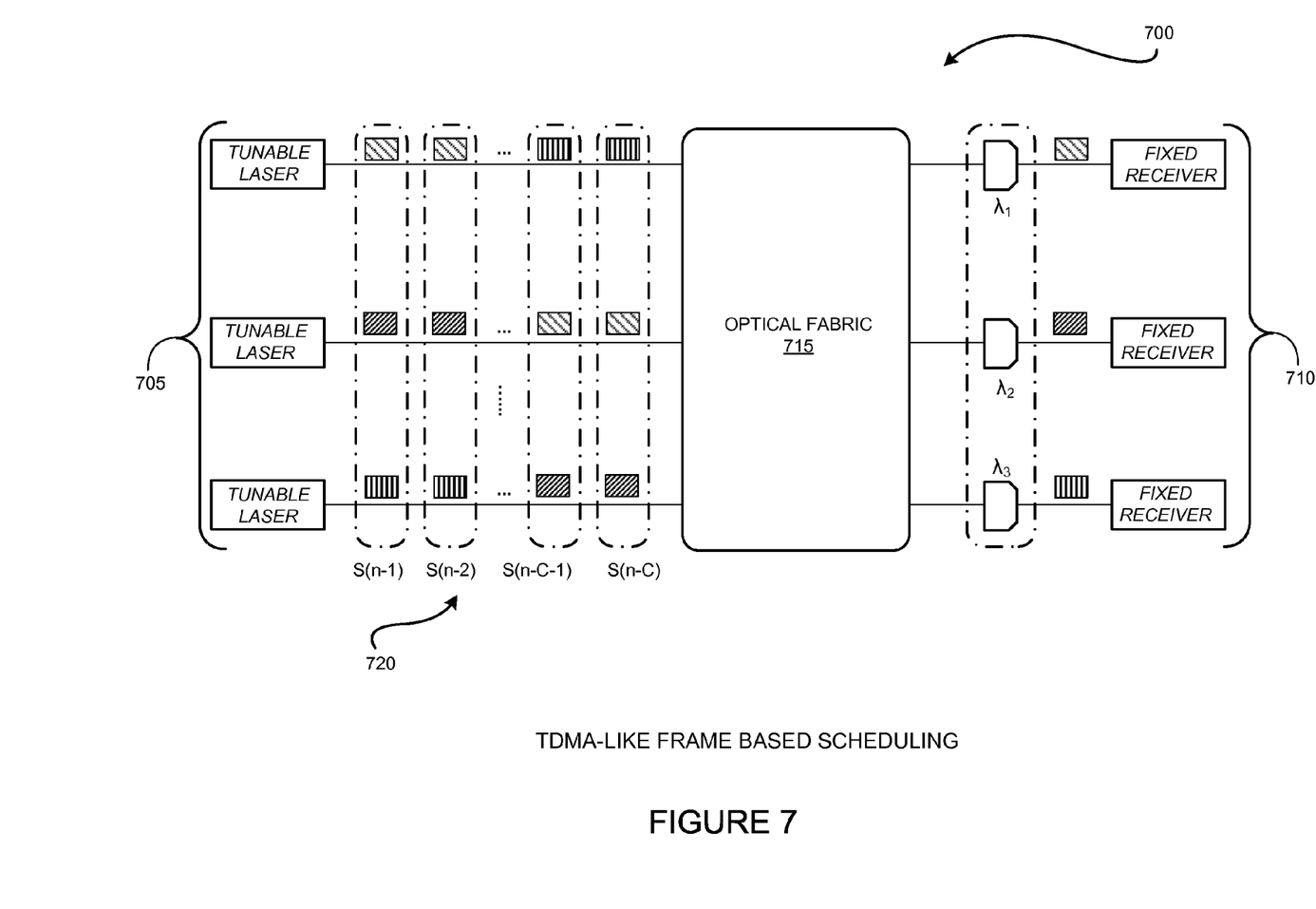
FIG. 7 illustrates an exemplary time division multiple access like frame based distributed scheduling method consistent with the present invention.

FIG. 7 illustrates an exemplary TDMA-like frame-based distributed scheduling method in an optical switch 700 consistent with the present invention. The optical switch 700 includes input ports 705 and output ports 710 coupled with an optical fabric 715. A TDMA-like frame-based scheduling process exploits the advantages of both the frame-based and TDMA-like scheduling processes (explained above). Instead of generating a schedule every M slots (like in the frame-based scheduling explained above) or maintaining M schedules and update one at each slot (like in the TDMA-like scheduling process explained above) a schedule 720 every C slots is generated and M/C schedules are maintained. FIG. 7 illustrates an example of TDMA-like frame-based distributed scheduling where the schedule 720 is generated with C=2. This scheduling process is also similar to a multiple-plane switch. Let L denote the number of planes. There are L=M/C planes. Each plane is used for C slots. For one plane, it is a frame-based algorithm with C as the frame size. Note that when C=M, the TDMA-like frame-based scheduling process may typically be a frame-based scheduling process (explained above) and when C=1, the TDMA-like frame-based scheduling process may typically be a TDMA-like scheduling process (also explained above).

Figure 8A:
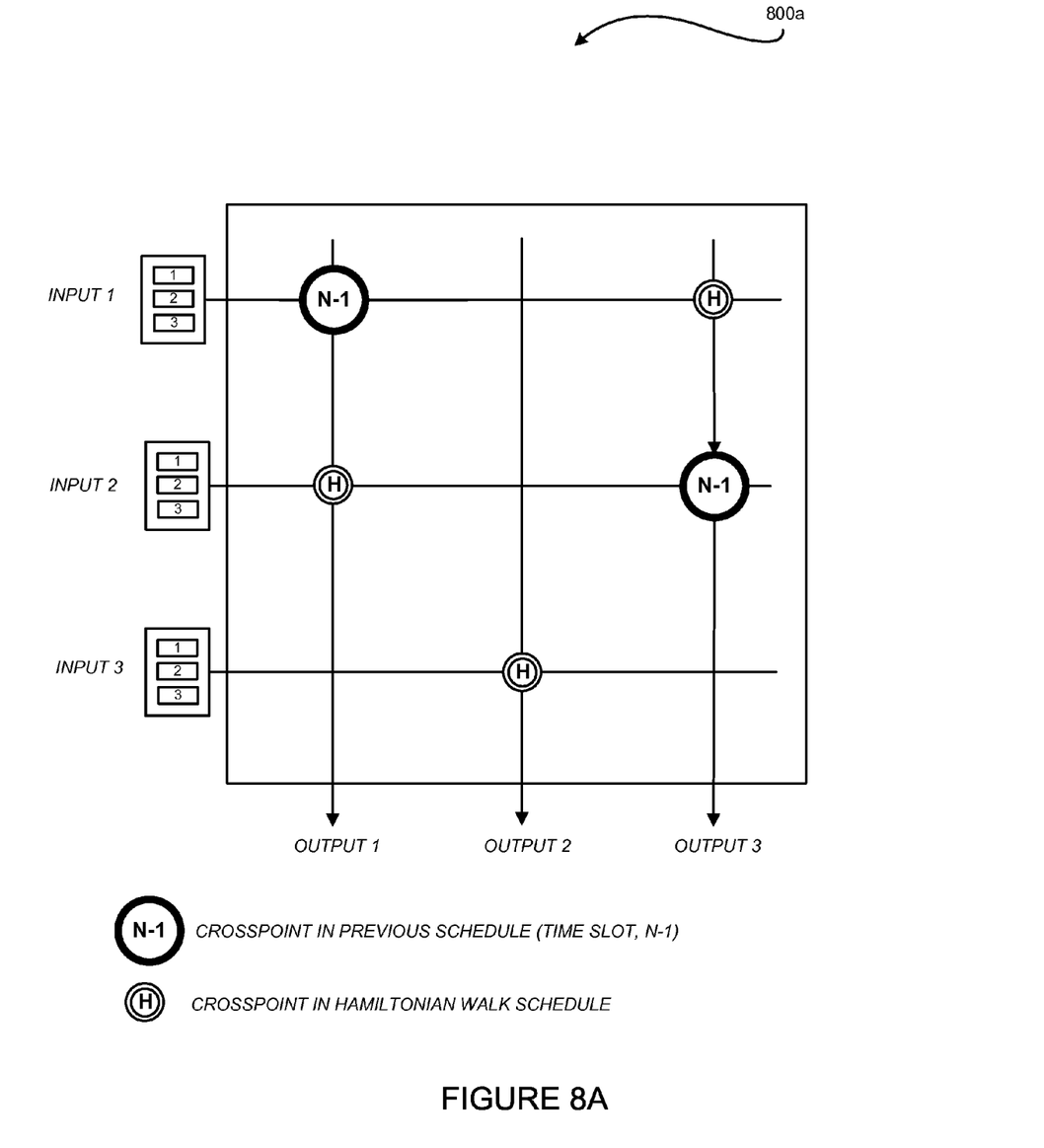
FIGS. 8A-8C illustrate a simple example of operations of an exemplary scheduling method consistent with the present invention in a 3-by-3 switch.
Figure 8B:
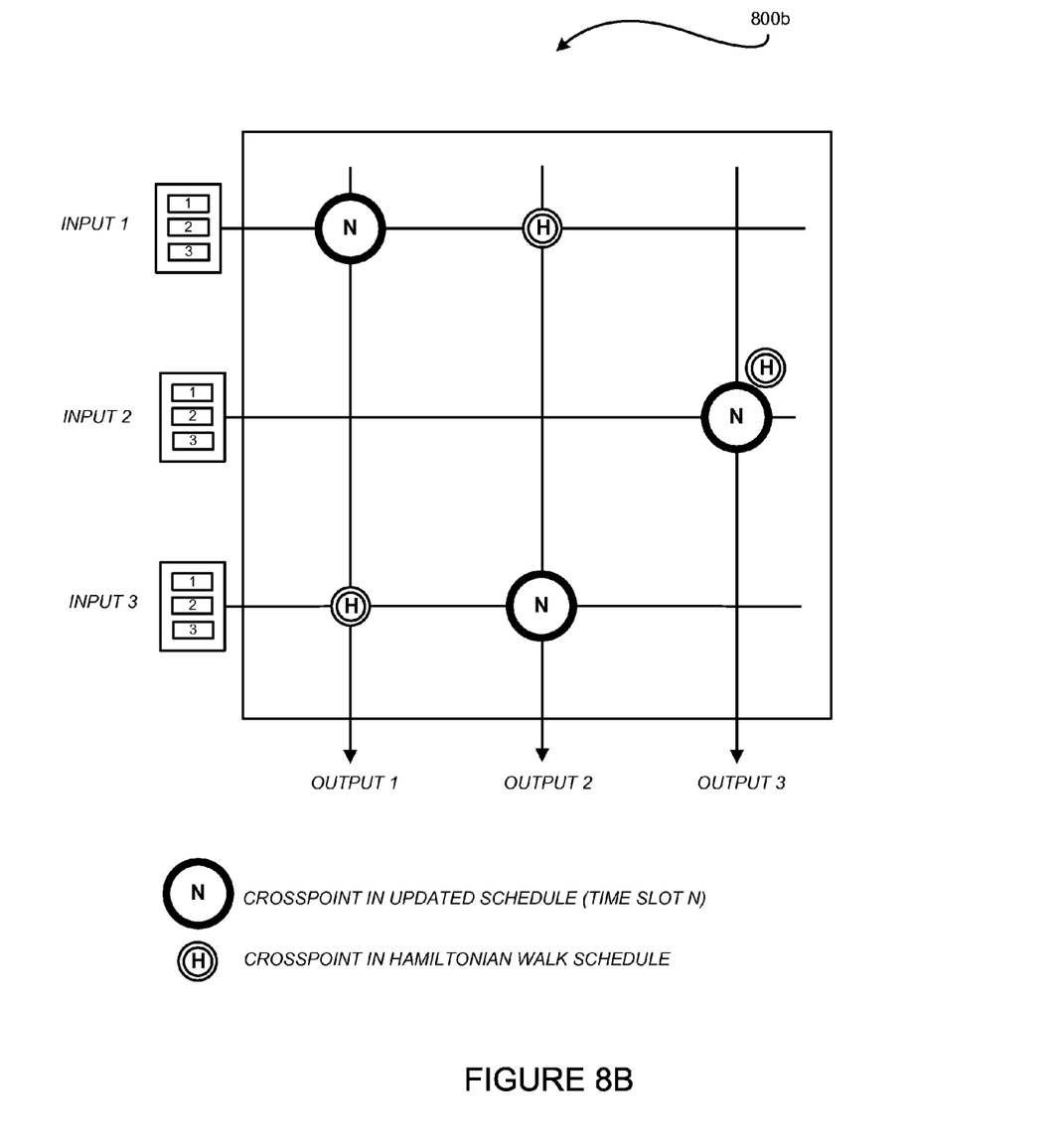
Figure 8C:
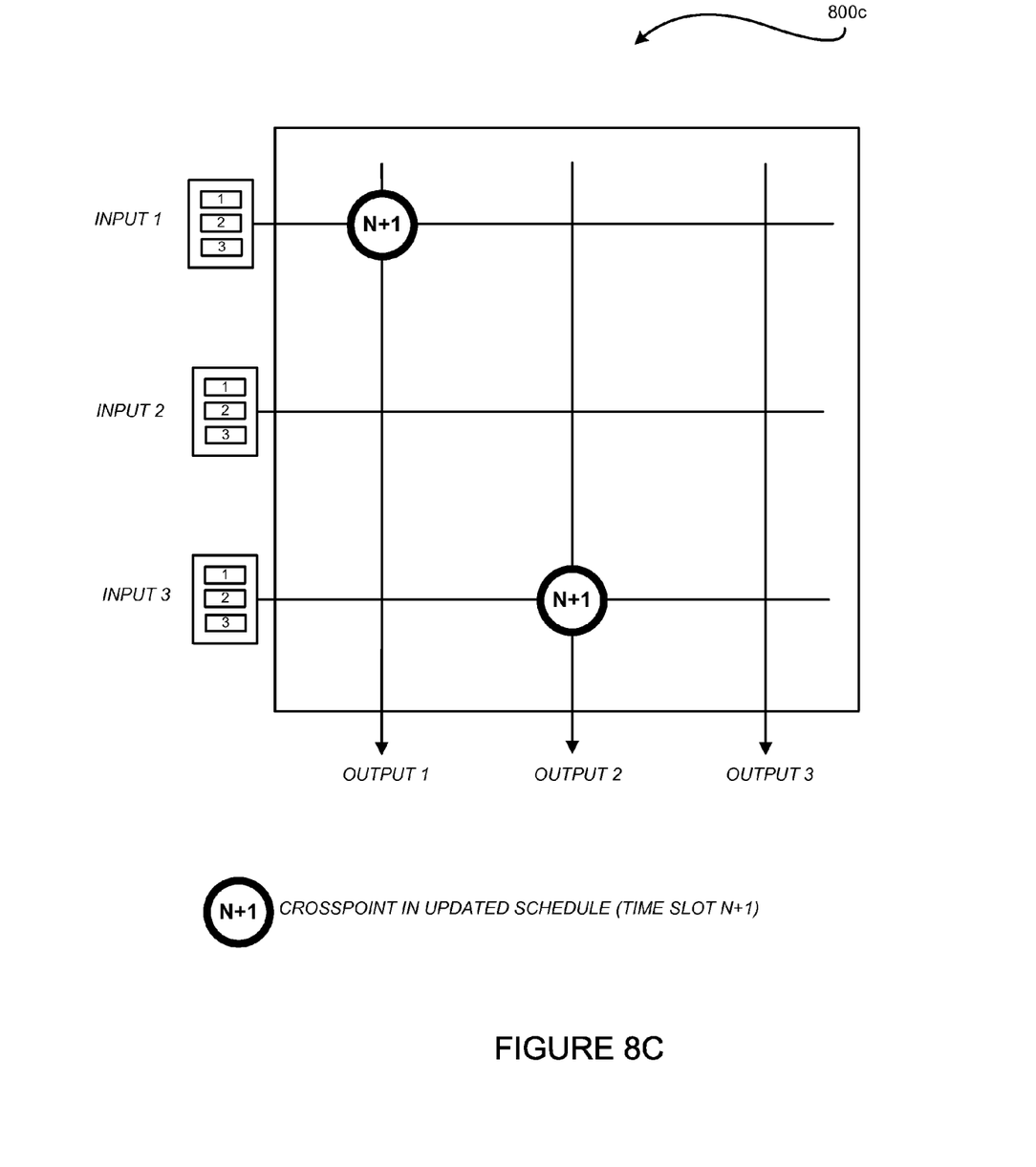

§5.4 EXAMPLES OF EXEMPLARY SCHEDULING METHOD Consistent with the Present Invention The '207 provisional application provided an example to help illustrate operations of the exemplary HELIOS distributed scheduling process. FIGS. 8A-8C illustrate an example of operations consistent with the HELIOS scheduling process pseudo code and properties set forth in §6.3 above, with reference to the examples illustrated in '207 application. In these figures, RTT=0 and n=3 and adding a crosspoint$_{i,j}$ to the updated schedule means that $S_{ij}$ (n)=1.

Referring first to FIG. 8A, the previous schedule 800a, at time slot n−1, includes crosspoint (1,1) and crosspoint (2,3) and the Hamiltonian walk schedule includes crosspoints {(1, 3), (2,1), (3,2)}. For input 1, since crosspoints {(1,1), (1,2)} are not in the Hamiltonian walk schedule, $S_{11}$(n)= $S_{11}$ (n−1)=1 and $S_{12}$(n)=$S_{12}$ (n−1)=0. (Recall line (a) of the pseudo code, and 410 of FIG. 4.) Therefore, crosspoint (1,1) is added to the updated schedule 800b as shown in FIG. 8B.

Referring back to FIG. 8A, for crosspoint (1,3), since it is not in the Hamiltonian walk schedule (Recall 405 of FIG. 4.) and not in the previous schedule (Recall 415 of FIG. 4.), it is determined whether any neighbor crosspoints (crosspoints {(1,1), (1,2), (2,3), (3,3)}) are active in the previous schedule (Recall 425 of FIG. 4.). Since the crosspoint (1,1) is active, as shown in FIG. 8A, $S_{13}$ (n)=0. Therefore, the crosspoint (1,3) is excluded from the updated schedule 800b as shown in FIG. 8B. (Recall line (f) of the pseudo code, and 435 of FIG. 4.) Thus, for input 1, the only crosspoint in the updated schedule is crosspoint (1,1).

Referring again to FIG. 8A, similarly for input 2, since crosspoint (2,1) is in the Hamiltonian schedule and not in the previous schedule, it is determined whether any neighbor crosspoints (crosspoints {(1,1), (3,1), (2,2), (2,3)}) are active in the previous schedule. (Recall 405, 415, and 425 of FIG. 4.) Since the crosspoint (1,1), as shown in FIG. 8A, is active, $S_{21}$ (n)=0. Therefore, the crosspoint (2,1) is excluded from the updated schedule 800b as shown in FIG. 8B. (Recall line (f) of the pseudo code, and 430 and 435 of FIG. 4.) Referring back to FIG. 8A, since crosspoints {(2,2), (2,3)} are not in Hamiltonian walk schedule, hat $S_{22}(n)=S_{22}(n-1)=0$ and $S_{23}(n)=S_{23}(n-1)=1$. (Recall line (a) of the pseudo code, and 410 of FIG. 4.) Therefore, crosspoint (2,3) is added to the updated schedule 800b as shown in FIG. 8B. Thus, for input 2, the only crosspoint in the updated schedule is crosspoint (2,3).

Referring again to FIG. 8A, similarly for input 3, since crosspoints {(3,1), (3,3)} are not in Hamiltonian walk schedule, $S_{31}(n)=S_{31}(n-1)=0$ and $S_{33}(n)=S_{33}(n-1)=0$. (Recall line (a) of the pseudo code, and 410 of FIG. 4.) Therefore, neither crosspoints {(3,1), (3,3)} are added to the updated schedule 800b as shown in FIG. 8B. Referring back to FIG. 8A, since crosspoint (3,2) is in the Hamiltonian schedule and not in the previous schedule, it is determined whether any neighbor crosspoints (crosspoints {(1,2), (2,2), (3,1), (3,3)}) were active in the previous schedule. (Recall 405, 415, and 425 of FIG. 4.) Since none of those neighbor crosspoints, as shown in FIG. 8A, were active, the state of the schedule is a function of a probability $p_{ij}$, which is a function of the queue size of crosspoint (3,2). (Recall lines (d) and (e) of the pseudo code, and 440 of FIG. 4.) As explained above, longer the queue $VOQ_{ij}$, higher is the probability of the crosspoint (i,j) becoming active. In the current example, it is assumed that the $VOQ_{3,2}$ is long enough for the crosspoint (3,2) to be activated. That is, $S_{32}(n)=1$. Therefore, the crosspoint (3,2) is added to the updated schedule 800b as shown in FIG. 8B. Thus, for input 3, the only crosspoint in the updated schedule is crosspoint (3,2). Finally, the crosspoints in the updated schedule 800b $S(n)=\{(1,1), (2,3), (3,2)\}$ as shown in FIG. 8B.

FIG. 8C illustrates determining a schedule 800c, at time slot (n+1). In this scenario, the updated schedule would be schedule S(n+1) and the previous schedule would be the schedule 800b, S(n) at time slot n. The schedule S(n+1) in FIG. 8C is determined using schedule S(n) and the Hamiltonian walk schedule in FIG. 8B in a way similar to schedule S(n) which is determined, as explained above, using schedule S(n−1) and the Hamiltonian walk schedule in FIG. 8A. However, in this scenario: the crosspoint (2,3) (shown in FIG. 8B) the state of the schedule is a function of the probability $p_{ij}$ which is a function of the queue size of crosspoint (2,3) (Recall lines (b) and (c) of the pseudo code.), is assumed to have a queue size $VOQ_{2,3}$ that is not long enough for the crosspoint (2,3) to become active. That is, $S_{23}(n+1)=0$. Therefore, the crosspoint (2,3) is excluded from the updated schedule S(n+1) as shown in FIG. 8C.

§5.5 CHARACTERISTICS OF EXEMPLARY EMBODIMENTS

The stationary distribution of an exemplary system is provided in Section III of the '207 provisional application. Stability of the exemplary system is demonstrated in Section IV of the '207 provisional application. Finally, simulation results of the exemplary system, which show its delay performance, are presented in Section V of the '207 provisional application.

§5.6 CONCLUSION

As can be appreciated from the foregoing, embodiments consistent with the present invention can provide scheduling for an optical switch. The exemplary distributed scheduling process achieves 100% throughput for any admissible Bernoulli arrival traffic. The exemplary distributed scheduling process may be easily adapted to work for any finite round trip time, without sacrificing any throughput. Simulation results also showed that this distributed scheduling process can provide very good delay performance for different traffic patterns and for different round trip times associated with current switches.

What is claimed is:

1. A computer-implemented method for scheduling packets in a switch having a plurality of output ports, a plurality of input ports, each of the plurality of input ports having a virtual output queue corresponding to each of the plurality of output ports, and a switch fabric coupling each of the input ports with each of the output ports, the computer-implemented method comprising:
   a) generating or receiving a Hamiltonian walk schedule which defines, for each input port i-output port j crosspoint$_{i,j}$, whether the crosspoint$_{i,j}$ is in the Hamiltonian walk schedule or not;
   b) accepting a previous schedule which defines, for each input port i-output port j crosspoint$_{i,j}$, whether the crosspoint$_{i,j}$ is in the previous schedule or not, wherein,
      1) for each input port i, there is at most one crosspoint$_{i,j}$ scheduled in the previous schedule, and
      2) for each output port j, there is at most one crosspoint$_{i,j}$ scheduled in the previous schedule; and
   c) at each input port i, for each crosspoint$_{i,j}$ merging the previous schedule with the Hamiltonian walk schedule to define an updated schedule such that:
      1) for a crosspoint$_{i,j}$ that is not in the Hamiltonian walk schedule, maintaining a value of the crosspoint$_{i,j}$ in the updated schedule as that value of the corresponding crosspoint$_{i,j}$ in the previous schedule, and
      2) for a crosspoint$_{i,j}$ that is in the Hamiltonian walk schedule,
         i) determining whether or not the crosspoint$_{i,j}$ belongs to the previous schedule,
         ii) responsive to a determination that the crosspoint$_{i,j}$ does belong to the previous schedule, determining whether or not to maintain the crosspoint$_{i,j}$ in the updated schedule as a function of an occupancy of a $j^{th}$ virtual output queue corresponding to the input port l and the output port j, and
         iii) responsive to a determination that the crosspoint i,j does not belong to the previous schedule,
            A) determining whether or not any neighbor crosspoints$_{k,l}$ of crosspoint$_{i,j}$ belong to the previous schedule by
               observing a monitor of the switch to determine whether the output port j received a packet from an input port k, different from input port i, in a time slot immediately before a current time slot, and
               responsive to a determination that the output port j did receive a packet from an input port k, different from input port i, in the time slot immediately before the current time slot, determining that a crosspoint$_{k,j}$ belonged to the previous schedule,
            B) responsive to a determination that a neighbor crosspoint$_{k,l}$ of the crosspoint$_{i,j}$ belonged to the previous schedule, excluding the crosspoint$_{i,j}$ from the updated schedule, and
            C) responsive to a determination that a neighbor crosspoint$_{k,l}$ of the crosspoint$_{i,j}$ did not belong to the previous schedule, determining whether or not to add the crosspoint$_{i,j}$ to the updated schedule as a function of an occupancy of the $j^{th}$ virtual output queue corresponding to the input port i.

2. The method of claim 1, wherein the switch is an optical fiber based switch.

3. The method of claim 1, wherein the monitor is an energy detector that detects a wavelength of a signal received at each of the plurality of output ports.

4. The method of claim 3, wherein each of the plurality of output ports is configured to receive a packet transmitted at a predetermined wavelength.

5. The method of claim 1, wherein a crosspoint is a neighbor of crosspoint$_{i,j}$ if the crosspoint has the same input port i but a different output port j̄ than the output port j, or the same output port j but a different input port ī than the input port i.

6. The method of claim 1, wherein the act of determining whether or not to add the crosspoint$_{i,j}$ in the updated schedule as a function of an occupancy of the j$^{th}$ virtual output queue corresponding to the input port i,
  determines a weight of the j$^{th}$ virtual output queue corresponding to the input port i as a function of the occupancy of the queue, the weight being denoted as weight$_{i,j}$,
  determines a probability $$p_{i,j} = \frac{e^{weight_{i,j}}}{1 + e^{weight_{i,j}}},$$

and
  adds the crosspoint$_{i,j}$ to the updated schedule with a probability $p_{i,j}$, and otherwise does not add the crosspoint$_{i,j}$ to the updated schedule.

7. The method of claim 1, wherein the act of determining whether or not to add the crosspoint$_{i,j}$ to the updated schedule as a function of an occupancy of the j$^{th}$ virtual output queue corresponding to the input port i,
  determines a probability $p_{i,j}$ as a concave function of the occupancy of the j$^{th}$ virtual output queue corresponding to the input port i, and
adds the crosspoint$_{i,j}$ to the updated schedule with a probability $p_{i,j}$, and otherwise does not add the crosspoint$_{i,j}$ to the updated schedule.

8. The method of claim 1, wherein the schedule is generated at every M time slots, where M is a function of a round trip time for the packets in the switch.

9. The method of claim 8, wherein the updated schedule is a schedule of the packets for a current time slot.

10. The method of claim 8, wherein the previous schedule is a schedule of the packets at M time slots before a current time slot.

11. A scheduler for scheduling packets in a switch having a plurality of output ports, a plurality of input ports, each of the plurality of input ports having a virtual output queue corresponding to each of the plurality of output ports, and a switch fabric coupling each of the input ports with each of the output ports, the scheduler comprising:
  at least one processor; and
  at least one storage device storing program instructions which, when executed by the at least one processor, cause the processor to perform a method including:
    a) generating or receiving a Hamiltonian walk schedule which defines, for each input port i-output port j crosspoint$_{i,j}$, whether the crosspoint$_{i,j}$ is in the Hamiltonian walk schedule or not; and
    b) accepting a previous schedule which defines, for each input port i-output j port crosspoint$_{i,j}$, whether the crosspoint$_{i,j}$ is in the previous schedule or not, wherein,
      1) for each input port i, there is at most one crosspoint$_{i,j}$ scheduled in the previous schedule, and
      2) for each output port j, there is at most one crosspoint$_{i,j}$ scheduled in the previous schedule; and
    c) at each input port i, for each crosspoint$_{i,j}$ merging the previous schedule with the Hamiltonian walk schedule to define an updated schedule such that:
      1) for a crosspoint$_{i,j}$ that is not in the Hamiltonian walk schedule, maintaining a value of the crosspoint$_{i,j}$ in the updated schedule as that value of the corresponding crosspoint$_{i,j}$ in the previous schedule, and
      2) for a crosspoint$_{i,j}$ that is in the Hamiltonian walk schedule,
        i) determining whether or not the crosspoint$_{i,j}$ belongs to the previous schedule,
        ii) responsive to a determination that the crosspoint$_{i,j}$ does belong to the previous schedule, determining whether or not to maintain the crosspoint$_{i,j}$ in the updated schedule as a function of an occupancy of a j$^{th}$ virtual output queue corresponding to the input port i and the output j, and
        iii) responsive to a determination that the crosspoint$_{i,j}$ does not belong to the previous schedule,
          A) determining whether or not any neighbor crosspoints$_{k,l}$ of crosspoint$_{i,j}$ belong to the previous schedule by
            observing a monitor of the switch to determine whether the output port j received a packet from an input port k, different from input port i, in a time slot immediately before a current time slot, and
            responsive to a determination that the output port j did receive a packet from an input port k, different from input port i, in the time slot immediately before the current time slot, determining that a crosspoint$_{k,j}$ belonged to the previous schedule,
          B) responsive to a determination that a neighbor crosspoint$_{k,l}$ of the crosspoint$_{i,j}$ belonged to the previous schedule, excluding the crosspoint$_{i,j}$ from the updated schedule, and
          C) responsive to a determination that the neighbor crosspoint$_{k,l}$ of the crosspoint$_{i,j}$ did not belong to the previous schedule, determining whether or not to add the crosspoint$_{i,j}$ to the updated schedule as a function of an occupancy of the j$^{th}$ virtual output queue corresponding to the input port i.

12. The scheduler of claim 11, wherein the switch is an optical fiber based switch.

13. The scheduler of claim 11, wherein the monitor is an energy detector that detects a wavelength of a signal received at each of the plurality of output ports.

14. The scheduler of claim 13, wherein each of the plurality of output ports is configured to receive a packet transmitted at a predetermined wavelength.

15. The scheduler of claim 11, wherein a crosspoint is a neighbor of crosspoint$_{i,j}$ if the crosspoint has the same input port i but a different output port j̄ than the output port j, or the same output port j but a different input port ī than the input port i.

16. The scheduler of claim 11, wherein the act of determining whether or not to add the crosspoint$_{i,j}$ in the updated schedule as a function of an occupancy of the j$^{th}$ virtual output queue corresponding to the input port i, determines a weight of the $j^{th}$ virtual output queue corresponding to the input port i as a function of the occupancy of the queue, the weight being denoted as $weight_{i,j}$ determines a probability $$p_{i,j} = \frac{e^{weight_{i,j}}}{1 + e^{weight_{i,j}}},$$

and adds the $crosspoint_{i,j}$ to the updated schedule with a probability $p_{i,j}$, and otherwise does not add the $crosspoint_{i,j}$ to the updated schedule.

17. The scheduler of claim 11, wherein the act of determining whether or not to add the $crosspoint_{i,j}$ to the updated schedule as a function of an occupancy of the $j^{th}$ virtual output queue corresponding to the input port i, determines a probability $p_{i,j}$ as a concave function of the occupancy of the $j^{th}$ virtual output queue corresponding to the input port i, and adds the $crosspoint_{i,j}$ to the updated schedule with a probability $p_{i,j}$, and otherwise does not add the $crosspoint_{i,j}$ to the updated schedule.

18. The scheduler of claim 11, wherein the schedule is generated at every M time slots, where M is a function of a round trip time for the packets in the switch.

19. The scheduler of claim 18, wherein the updated schedule is a schedule of the packets for a current time slot.

20. The scheduler of claim 18, wherein the previous schedule is a schedule of the packets at M time slots before a current time slot.

* * * * *